United States Patent
Kobayashi et al.

(10) Patent No.: US 6,538,961 B2
(45) Date of Patent: Mar. 25, 2003

(54) APPARATUS AND METHOD FOR RECORDING AN OPTICAL DISC IDENTIFICATION CODE

(75) Inventors: Seiji Kobayashi, Kanagawa (JP); Toshihiro Fujiki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/159,923

(22) Filed: May 29, 2002

(65) Prior Publication Data

US 2002/0163867 A1 Nov. 7, 2002

Related U.S. Application Data

(62) Division of application No. 09/314,579, filed on May 18, 1999, now Pat. No. 6,414,913.

(51) Int. Cl.[7] .............................................. G11B 7/0045
(52) U.S. Cl. ...................... 369/14; 369/47.13; 369/52.1; 369/53.21; 369/94; 369/275.3; 369/283; 369/112.24
(58) Field of Search ............... 369/14–15, 47.12–47.13, 369/47.51, 52.1, 53.21, 94, 111, 275.1–275.5, 283, 286, 53.31, 53.37, 112.24; 380/201, 203; 705/51, 56, 57, 62, 58

(56) References Cited

U.S. PATENT DOCUMENTS

| | | |
|---|---|---|
| 5,400,319 A | 3/1995 | Fite et al. |
| 5,812,519 A | 9/1998 | Kawamura et al. |
| 5,828,648 A | 10/1998 | Takasu et al. |
| 6,208,736 B1 | 3/2001 | Gotoh et al. |

FOREIGN PATENT DOCUMENTS

| | | |
|---|---|---|
| DE | 0 768 652 | 4/1997 |
| DE | 298 22 695 | 4/1999 |
| EP | 0 634 741 | 1/1995 |
| EP | 0 682 341 | 11/1995 |
| EP | 0 813 194 | 12/1997 |

Primary Examiner—W. R. Young
(74) Attorney, Agent, or Firm—Frommer Lawrence & Haug LLP; William S. Frommer

(57) ABSTRACT

This invention relates to an optical disc recording apparatus, an optical disc recording method, and an optical disc, and the present invention is applied to, for example, apparatus for recording on a compact disc, compact discs, and compact disc players, and sub-data strings are recorded so that the main data strings is reproducible by an optical pickup for reproducing the main data string and the main data strings. are protected from being copied illegally without any adverse effect on reproduction of the pit-and-land main data strings The sub-data string ED is recorded by locally changing the reflectance of the reflection film in the form of irregularity such as pit or mark at the timing which does not affect the position information of the edge.

4 Claims, 10 Drawing Sheets

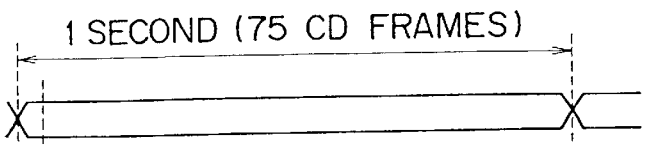
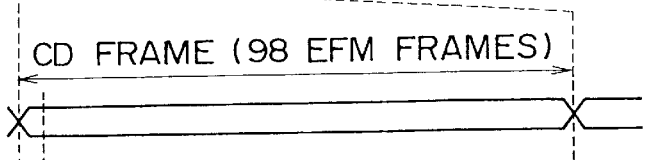
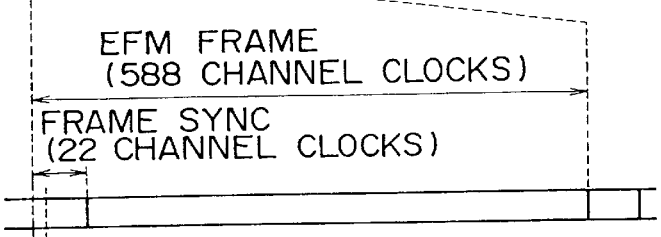
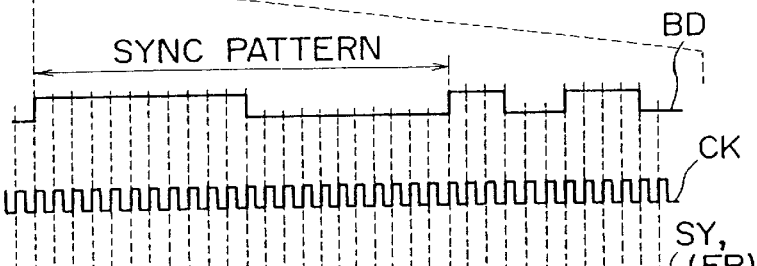
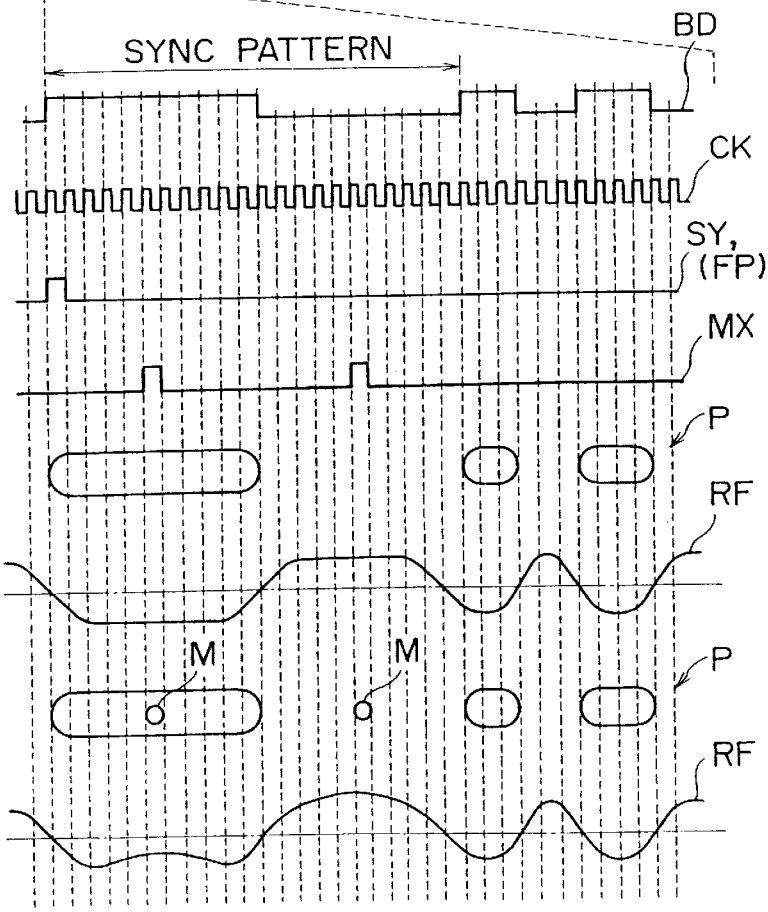

APPARATUS AND METHOD FOR RECORDING AN OPTICAL DISC IDENTIFICATION CODE

This application is a divisional of U.S. application Ser. No. 09/314,579, filed May 18, 1999, now U.S. Pat. No. 6,414,913.

BACKGROUND OF THE INVENTION

1. Field of the Invention

This invention relates to an optical disc recording apparatus, an optical disc recording method, and an optical disc, and the present invention is applied to, for example, apparatus for recording on a compact disc, compact discs, and compact disc players. In the present invention, by locally changing the reflection film on a disc on which information has been recorded previously in the form of pit string, sub-data strings are recorded so that the main data string is reproducible by an optical pickup for reproducing the main data string and the main data string is difficult to be copied illegally without any adverse effect on reproduction of the main data string in the form of pit string.

2. Description of Related Art

Heretofore, in recording the data on a compact disc, a data string to be recorded is subjected to data processing, and then subjected to EFM modulation (Eight to Fourteen Modulation) to form pit string having a time period of 3T to 11T, T denotes a predetermined basic cycle, and the audio data or the like is recorded.

On the other hand, a management data recording area is formed on a lead in area on the inside peripheral side, and a desired music or the like can be reproduced selectively with aid of TOC (Table Of Contents) recorded on the recording area.

On compact discs in which various data are recorded, codes which indicate the name of the maker and facility and disc number are marked on the inside of the lead in area so that the history of a compact disc is recognized visually.

By recognizing the history of a compact disc with reference to such a mark, illegal copy is distinguished depending if there is a mark or not. However, such a mark is marked so as to be recognized visually, but the mark is not reproduced by an optical pickup of a compact disc player. Therefore, a reproduction mechanism which is exclusively used for reproduction of the mark is required separately to identify illegal copy based on the mark.

Because the code which has been recorded by these methods is recorded in the same manner as used for recording the normal pit, the code can be duplicated by a method in which the protective film and aluminum reflection film of a compact disc is separated and a stamper is made based on the separated films, and the data could be copied illegally.

It is considered that, if the sub-information is recorded so that the sub-information is reproducible by an optical pickup for reproducing the audio data and illegal copy is made difficult without any adverse effect on reproduction of the audio data in the form of pit string, illegal copy is prevented by use of the secondary information.

The present invention was accomplished in view of this problem, and provides an optical disc recording apparatus, an optical disc recording method, and an optical disc made by applying the optical disc recording apparatus or the optical disc recording method, in which the sub-information is recorded so that the sub-information is reproducible by an optical pickup for reproducing the data in the form of pit string and illegal copy is made difficult without any adverse effect on reproduction of the audio data in the form of pit string, illegal copy is prevented by use of the secondary information.

SUMMARY OF THE INVENTION

To solve the above-mentioned problem, the present invention provides an optical disc recording apparatus and an optical disc recording method in which the reflectance of the information recording surface is changed by changing the light quantity of a light beam irradiated onto a disc like recording medium on which the main data string is recorded in the form of repeated pits on the information recording surface to record the sub data string.

The sub-data string is recorded by changing the reflectance of the information recording surface on the pits and/or lands of the optical disc.

The sub-data recorded in the form of reflectance change of the information recording surface on the disc like recording medium on which the information has been recorded in the form of convex/concave such as pit is not copied by the copying method in which the reflection film is separated and a stamper is made. Thereby, the sub-data string is recorded so that the data of the optical compact disc is protected from being illegally copied. Further, only by minimizing the reflectance change caused from the sub-data recorded as described herein above, the adverse effect of the sub-data on reproduction of the main data is avoided. Further, the sub-data recorded in the form of reflectance change can be detected and decoded as the change of reproduction signal by an optical pickup.

Further, in the present invention, 1 bit sub-data is recorded over a plurality of pits and lands. The reflectance of the information recording surface can be changed locally at the position located a predetermined distance apart from the edge. In the case that the present invention is structured as described herein above, the reflectance can be significantly changed locally without any adverse effect on the timing of the edge. As the result, the sub-data string recorded in the form of significant reflectance change can be reproduced consistently.

Thus in the optical disc as described herein above, the main data string is recorded in the form of repeated pits having the length corresponding to the main data string on the information recording surface and the pit is recorded in the form of physical configurational change of the information recording surface, and the sub-data string is recorded in the form of reflectance change of the information surface, such structure described herein above protects the data in the optical disc from being copied.

BRIEF DESCRIPTION OF THE DRAWINGS

FIG. 3(A-1) to FIG. 3(F-2) are time charts for describing the operation of the finishing unit shown in FIG. 1.

DETAILED DESCRIPTION OF THE PREFERRED EMBODIMENTS

The preferred embodiments will be described hereinafter in detail with reference to the drawings.

(1) FIRST EMBODIMENT

(1—1) Structure of the First Embodiment

FIG. 2(A) to FIG. 2(E) show time charts for describing the format of a compact disc in accordance with the present embodiment together with the sectional structure of the compact disc. A disc board 2 of a compact disc 1 (FIG. 2(D)) is formed by injection molding of polycarbonate or the like using a stamper as that of a normal compact disc 1. On the disc board 2, fine ridges and grooves corresponding to pits and lands are formed on the information recording side in injection molding. As shown with an arrow-a in a partially enlarged view (FIG. 2(E)), a reflection recording surface 3 for reflecting a laser beam is formed by, for example, vapor deposition on the information recording side of the disc board 2 of the compact disc 1, and a protecting film 4 for protecting the reflection recording surface 3 is subsequently formed.

The compact disc 1 is structured so as to record the audio signal or the like in the form of repeated pits and lands as a normal compact disc, and is structured so as to reproduce the audio signal or the like which has been recorded as described herein above by irradiating a laser beam L onto the reflection recording surface 3 through the disc board 2 and receiving the reflected laser beam.

Figure 2A:
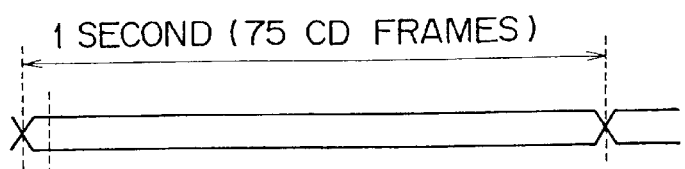
FIG. 2(A) to FIG. 2(E) are cross sectional views and time charts for describing a compact disc to be finished by the finishing unit shown in FIG. 1.
Figure 2B:
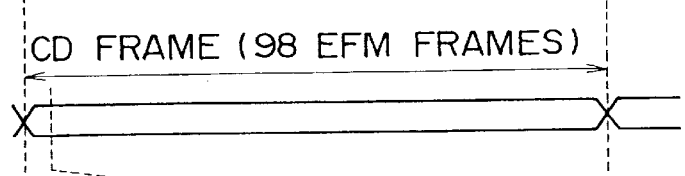
Figure 2C:
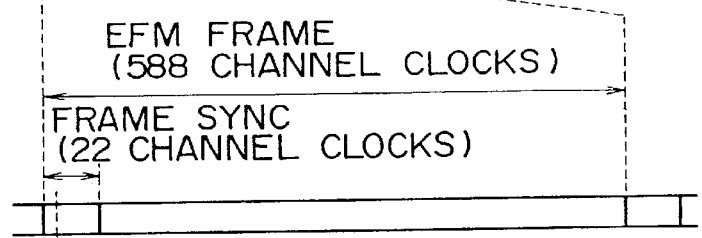
Figure 2D:
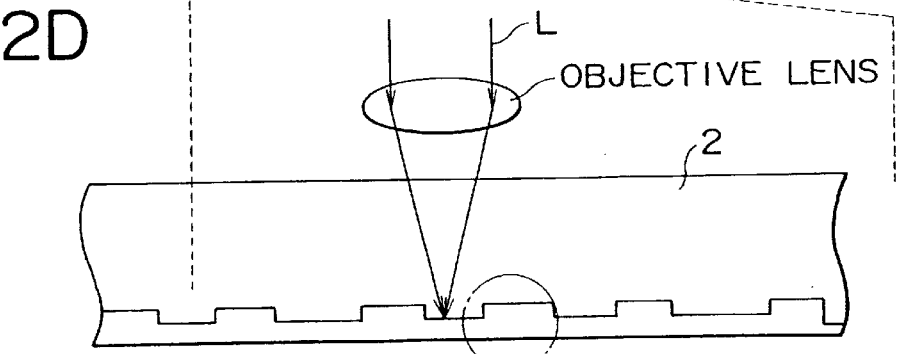
Figure 2E:
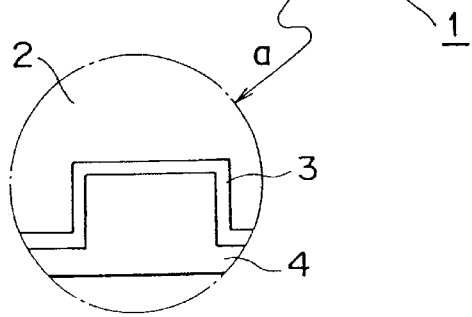

75 CD frames are allocated per 1 seconds (FIG. 2(A)) for repetition of pits and lands formed as described herein above as a normal compact disc, and 98 EFM frames are allocated to each CD frame (FIG. 2(B)). Further, each EFM frame is divided into 588 channel clocks, and the frame sync is allocated to the head 22 channel clocks. The pit and land having a basic cycle T of 1 channel clock repeat with length of integral multiple of the basic cycle, and repeat with length of 11T time period on the frame sync.

Further in the present embodiment, the reflection recording surface 3 has the same film structure as the information recording surface of a CD-R. The compact disc 1 is structured so that the reflectance of the reflection recording surface 3 at the position where a laser beam is irradiated changes reversibly when the laser beam L having a beam quantity equal to or larger than the predetermined value is irradiated, and so that the reflectance change is detected based on the beam quantity change of the reflected beam.

Figure 1:
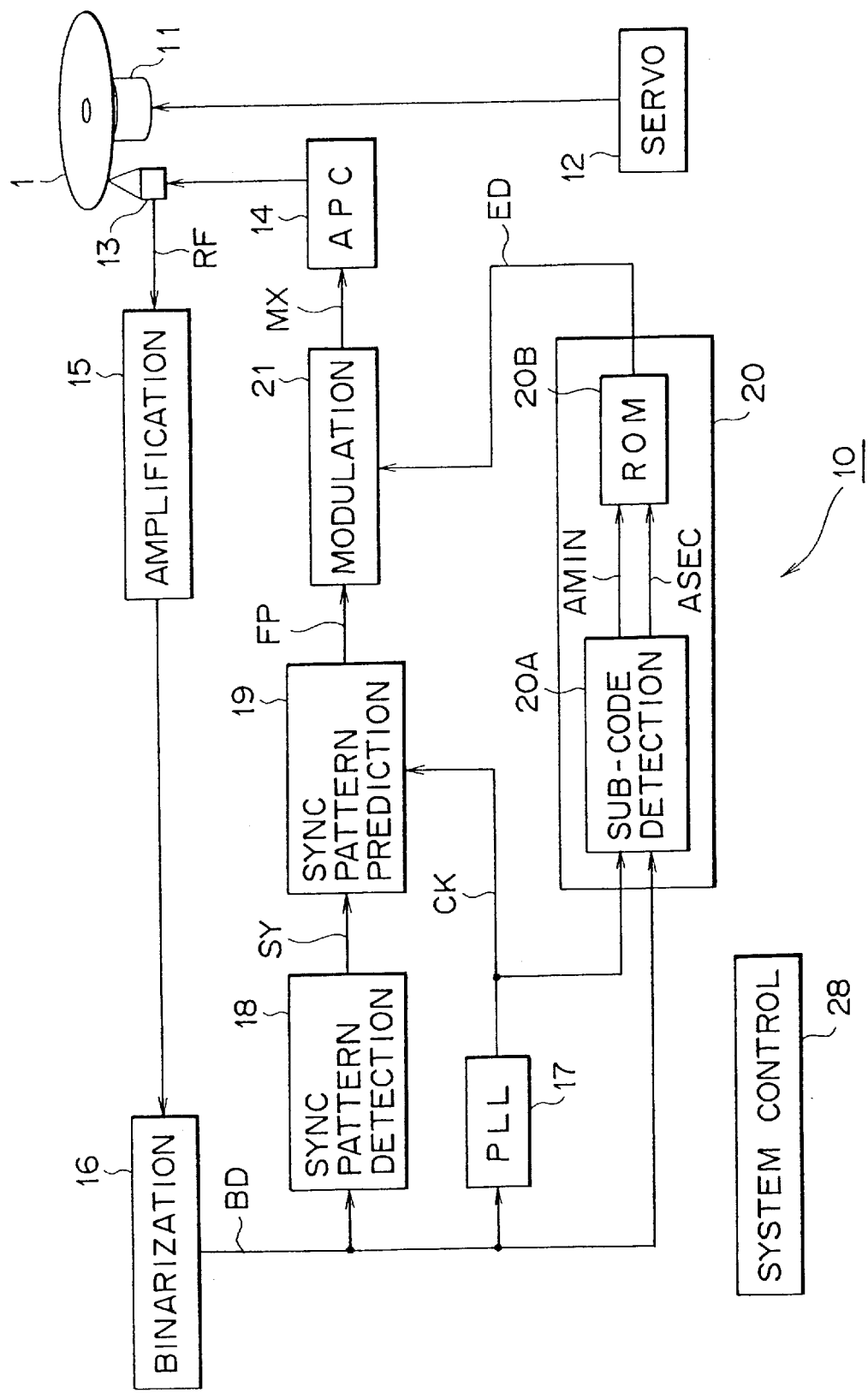
FIG. 1 is a block diagram for illustrating a compact disc finishing unit in accordance with the first embodiment of the present invention.

FIG. 1 is a block diagram for illustrating a finishing apparatus for finishing compact discs. A disc identification code is recorded on compact discs 1 by the finishing apparatus and the compact discs 1 are shipped.

In detail, in the finishing unit 10, a spindle motor 11 rotates a compact disc 1 at a constant linear speed under the control of a servo circuit 12.

An optical pickup 13 irradiates a laser beam onto the compact disc 1 and receives the reflected beam, and generates a reproduction signal RF having the signal level which changes depending on the beam quantity of the reflected beam. The optical pickup 13 increases the beam quantity of the laser beam at the predetermined timing under the control of APC (Automatic Power Control) circuit 14 to thereby change the local reflectance of the reflection recording surface 3 of the compact disc 1.

An amplifier circuit 15 amplifies the reproduction signal RF with a predetermined gain and sends out the amplified signal. A binarization circuit 16 binarizes the reproduction signal supplied from the amplification circuit 16 with reference to a predetermined reference level, and sends out a binary signal BD. A PLL circuit 17 reproduces a channel clock CK from the binary signal BD.

A sync pattern detecting circuit 18 detects the sync pattern which appears repeatedly in the binary signal BD. In detail, as shown in FIG. 3(A-1) to FIG. 3(A-4) for comparison with FIG. 2(A) to FIG. 2(E), the level of the binary signal BD is changed depending on the pit string formed on the compact disc 1, the signal level is kept high during the time period of 11T in the frame sync allocated to the head of each frame, and then the signal level is kept low during the subsequent time period of 11T. The sync pattern detecting circuit 18 judges the successive signal level of the binary signal BD with reference to the channel clock CK by use of a multiple connected flip-flop circuit to detect the frame sync. Further, the sync pattern detecting circuit 18 generates a sync pattern detection pulse SY (FIG. 3(C)) having the signal level which rises during the time period T of 1 channel clock at the head of each frame.

The sync pattern predicting circuit 19 comprises a ring counter for counting the channel clock CK with reference to the sync pattern detection pulse SY, and generates a frame pulse FP (FIG. 3(C)) having the signal level which rises during the time period of T of 1 channel clock at the head of each frame. The sync pattern predicting circuit 19 thereby predicts each frame sync and generates a frame pulse FP even if the sync pattern detecting circuit 18 fails to correctly detect a frame sync due to defect or the like.

A disc identification code generating circuit 20 comprises a sub-code detecting circuit 20A and read only memory (ROM) 20B. The sub-code detecting circuit 20A decodes the binary signal BD to reproduce a sub-code information included in the binary signal BD. Further, the disc identification code generating circuit 20 selectively sends out the time information of minute (AMIN) and second (ASEC) from among the time information of minute, second, and frame included in the sub-code information.

The time information of minute (AMIN) and second (ASEC) is the sub-code information specified in the specification of the compact disc 1, which indicates the position of the data on the compact disc 1. In detail, the minute (AMIN) time information is the information which represents the data recorded on the compact disc 1 in minute unit, for example, may be a value selected from numbers from 0 to 74. The second (ASEC) time information is the information which finely specifies the minute (AMIN) unit position in second unit, and may be a value selected from numbers from 0 to 59.

The read only memory 20B holds the disc identification code ED, and sends out the data held by use of the minute (AMIN) and second (AMIN) time information supplied from the sub-code detecting circuit 20A as the address. The disc identification code BD consists of an ID information which is specific to each disc, information associated with a factory where the compact disc is manufactured, manufacturing date information, and information to control copying permission/inhibition, and additionally includes a sync signal for representing the beginning of the disc identification code and error correction code. The read only memory 20B holds the disc identification code ED in the form of bit data and generates 1 bit disc identification code ED to 1 address of the minute (AMIN) and second (ASEC) time information. As the result, the read only memory 20B generates a 1 bit disc identification code ED per 1 second.

A modulating circuit 21 raises a control signal MX of an APC circuit 14 at the predetermined timing in response to the disc identification code ED to thereby raise the beam quantity of the laser beam at a moment, and locally changes the local reflectance of the compact disc 1.

Figure 4:
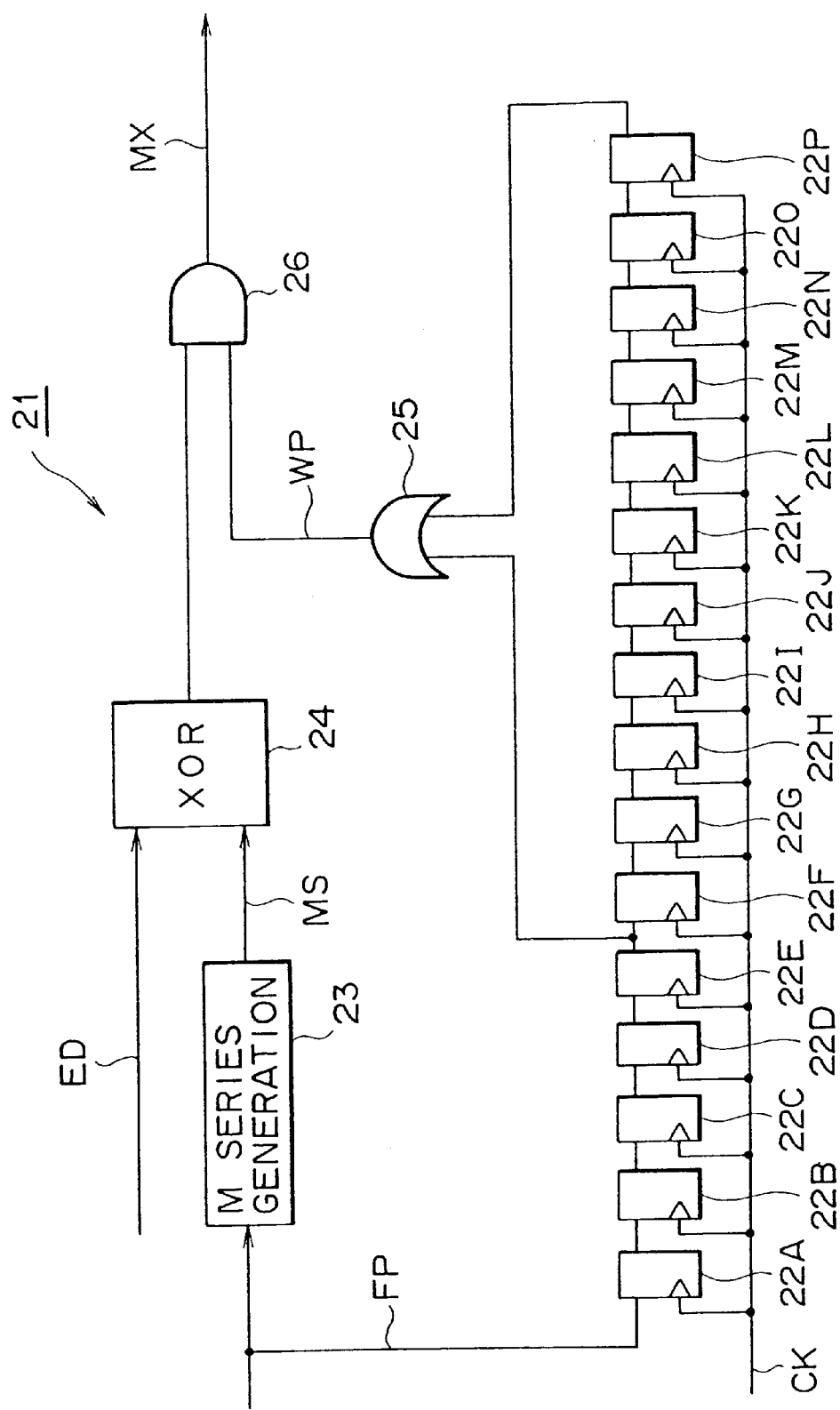
FIG. 4 is a block diagram for illustrating a modulation circuit of the finishing unit shown in FIG. 1.

In detail, as shown in FIG. 4, an M series generating circuit 23 comprises a plurality of cascade-connected flip-flops and exclusive OR circuits in the modulating circuit 21, set an initial value to the plurality of flip-flops at the timing corresponding to the second (ASEC) time information change, and then successively transfers the set contents synchronously with the frame pulse FP and generates an M series random number data MS in which logic 1 and logic 0 appear with the same probability by feeding back between predetermined stages. The M series signal MS is changed to a pseudo random series which repeats the same pattern with a cycle corresponding to 1 bit disc identification code ED.

The exclusive OR circuit 24 receives the M series signal MS and the disc identification code ED, and generates an exclusive OR signal. In detail, the exclusive OR circuit 24 generates an exclusive OR signal depending on the logical level of the M series signal MS when the disc identification code ED is logic 0, and on the other hand, generates an exclusive OR signal formed by inverting the logical level of the M series signal MS when the disc identification code ED is logic 1. As the result, the exclusive OR circuit 24 modulates the disc identification code ED based on the M series random number.

Flip-flops 22A to 22P are cascade-connected, the frame pulse FP is supplied to the first stage flip-flop 22A The flip-flops 22A to 22P successively transfer the frame pulse FP synchronously with the channel clock CK.

An OR circuit 25 receives outputs from the fifth stage flip-flop 22E and the final stage flip-flop 22P namely the 16-th stage flip-flop from among the flip-flops 22A to 22P, and generates an OR signal. The OR circuit 25 thereby provides a pulse signal WP having the signal level which is kept high during 1 channel clock cycle T when the time period of the channel clock CK of 5 cycles elapses after starting of a frame sync, and which is kept high during 1 channel clock cycle T when the time period of the channel clock CK of 16 cycles elapses after starting of a frame sync. As the result, the time period while the signal level of the pulse signal WP is 1 channel clock cycle T at the respective middle of the pit of 11T cycles and the land of 11T cycles, and is temporally positioned sufficiently far apart from the both edges of the pit and the both edges of the land.

An AND circuit 26 generates a logical product of the exclusive OR signal supplied from the exclusive OR circuit 24 and the pulse signal WP as a beam quantity control signal MX for the APC circuit 14 (FIG. 3(D)).

The APC circuit (FIG. 1) switches the beam quantity of the laser beam from reproduction beam quantity to recording beam quantity depending on the beam quantity control signal MX. The recording beam quantity means the beam quantity which is sufficient to change the reflectance of the reflection recording surface of the compact disc 1.

A system control circuit 28 comprises a computer for controlling the whole operation of the finishing unit 10, operates the optical pickup 13 to seek with reference to the sub-code detected by the sub-code detecting circuit 20A, and records the above-mentioned disc identification code ED on a predetermined area of the compact disc 1.

The finishing unit 10 raises the beam quantity of the laser beam depending on the disc identification code ED modulated by use of the random number data MS at the middle of the pit of 11T cycles and the middle of the land of 11T cycles which forms the sync pattern to additionally record the disc identification code ED (FIG. 3(E-1) and FIG. 3(E-2)) As the result, in the compact disc 1, if the disc identification code ED is not additionally recorded, a reproduction signal RF having the signal waveform saturated to a constant value for these pit and land (FIG. 3(F-1)) is obtained, on the other hand, if the disc identification code ED is additionally recorded, a reproduction signal RF having the signal level which varies locally depending on the property of the reflection recording surface 3 around the middle of the pit and the land (FIG. 3(F-2)) is obtained. The disc identification code ED of the compact disc 1 is reproduced with reference to the change in the signal level of the reproduction signal RF.

Figure 5:
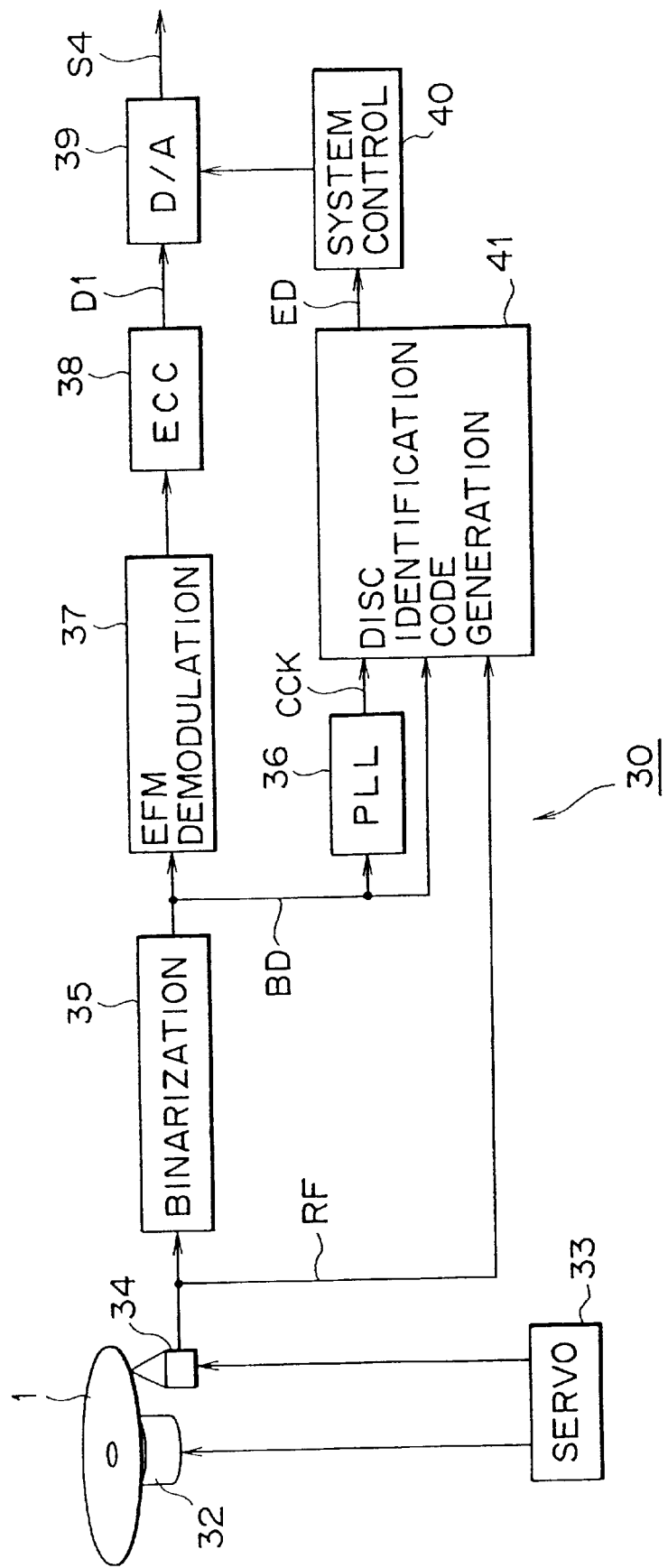
FIG. 5 is a block diagram for illustrating a compact disc player for reproducing a compact disc made by the finishing unit shown in FIG. 1.

FIG. 5 is a block diagram for illustrating a compact disc player for reproducing the compact disc 1. In the compact disc player 30, a spindle motor 32 rotates the compact disc 1 at a constant linear speed under the control of a servo circuit 33.

The optical pickup 34 irradiates the laser beam onto the compact disc 1 and receives the reflected beam, and generates a reproduction signal RF having the signal level which varies depending on the beam quantity of the reflected beam The signal level of the reproduction signal RF varies depending on the pit recorded on the compact disc 1. At that time, because the compact disc 1 is formed so that the local reflectance changes depending on the record of the disc identification code ED, the signal level of the reproduction signal RF varies resultantly depending on the change in reflectance due to the disc identification code ED. However, because the local reflectance changes at the position located a predetermined distance apart from the edge of the pit and land of 11T cycle, the timing when the signal level of the reproduction signal RF crosses the reference level for binary identification on the pit and land is maintained at the same timing as in the case of no reflectance change.

The binarization circuit 35 binarizes the reproduction signal RF with reference to a predetermined reference level to generate a binary signal BD. At that time, because the local reflection changes at the middle of the pit and land of 11T cycles of the compact disc 1, the local reflection change is not detected resultantly in the binary signal BD.

A PLL circuit 36 is operated with reference to the binary signal BD to reproduce the channel clock CK of the reproduction signal RF.

An EFM demodulation circuit 37 latches the binary signal BD successively with reference to the channel clock CCK to thereby reproduce a reproduction data corresponding to the EFM modulation signal S2. Further the EFM demodulation circuit 37 EFM modulates the reproduction data, thereafter divides the demodulated data into 8-bit unit with reference to the frame sync, interleaves the generated 8-bit unit signal, and provides to an ECC (Error Correcting Code) circuit 38.

The ECC circuit 38 performs error correction processing of the output data based on the error correction code added to the output data of the EFM demodulation circuit 37 to thereby reproduce and send out the audio data D1.

A digital/analog converting circuit (D/A) 39 performs digital/analog conversion processing of the audio data D1 supplied from the ECC circuit 38 and generates an analog audio signal S4. At that time, if the digital/analog converting circuit 39 judges the compact disc 1 to be an illegally copied compact disc, then stops the output of the audio signal S4 under the control of a system control circuit 40.

The system control circuit 40 comprises a computer for controlling the operation of the compact disc player 30. The system control circuit 40 controls the whole operation so that the predetermined area of tile compact disc 1 receives an access, and judges whether the compact disc 1 is an illegally copied compact disc or not based on the disc identification code ED supplied from the disc identification code reproducing circuit 41, and if the compact disc 1 is judged to be an illegally copied compact disc, then the system control circuit 40 stops the output of the audio signal S4 being supplied from the digital/analog converting circuit 39.

A disc identification code reproducing circuit 41 decodes the disc identification code ED from the reproduction signal RF and sends out.

Figure 6:
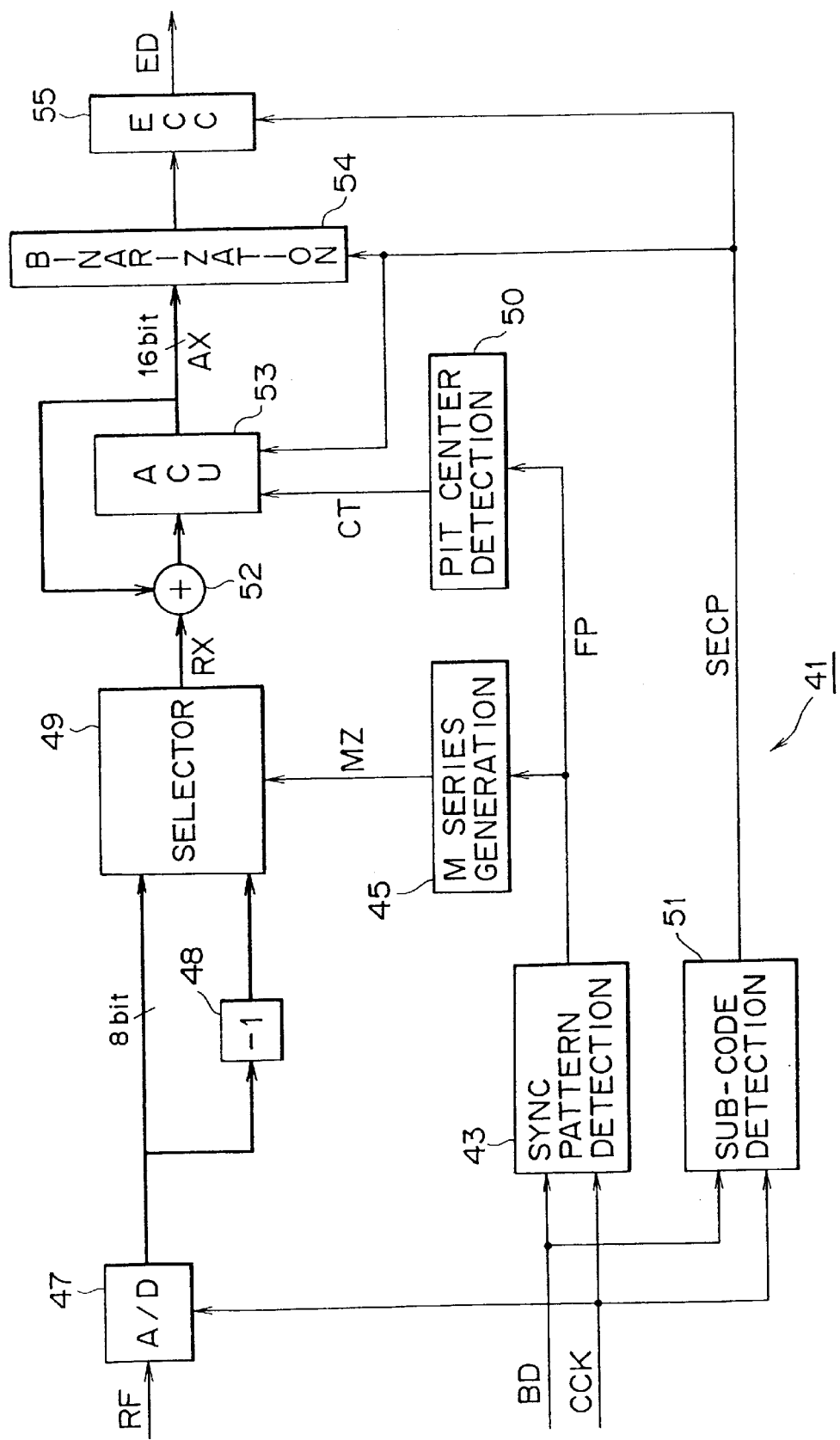
FIG. 6 is a block diagram for illustrating a disc identification code reproducing circuit of the compact disc player shown in FIG. 5.

FIG. 6 is a block diagram for illustrating the detail of the disc identification code reproducing circuit 41. In the disc identification code reproducing circuit 41, a sync pattern detecting circuit 43 latches the binary signal BD successively with reference to the channel clock CCK, and judges the consecutive logical level to thereby detect the sync pattern. Further, the sync pattern detecting circuit 43 generates a frame pulse FP having the signal level which is kept high during the time period of 1 channel clock T when each frame starts with reference to the sync pattern detected by the sync pattern detecting circuit 43.

An M series generating circuit 45 initializes the address at the predetermined timing under the control of the system control circuit 40 and thereafter steps the address successively by use of the frame pulse FP to take an access to the built-in read only memory, and thereby generates an M series random number data MZ corresponding to the M series random number data MS generated by the finishing unit 10.

An analog/digital converting circuit (A/D) 47 performs analog/digital conversion processing of the reproduction signal RF with reference to the channel clock CCK to generate an 8-bit digital reproduction signal. A polarity inverting circuit (−1) 48 inverts the polarity of the digital reproduction signal and sends it out.

A selector 49 selectively sends out the digital reproduction signal supplied directly from the analog/digital converting circuit 47 or the digital reproduction signal having the inverted polarity supplied from the polarity inverting circuit 48 depending on the logical level of the M series random number data MZ supplied from the M series generating circuit 45. In detail, the selector 49 selects and sends out the digital reproduction signal supplied directly if the logical level of the M series random number data MZ is 1, and on the other hand, the selector 49 selects and sends out the digital reproduction signal having the inverted polarity if the logical level of the M series random number data MZ is 0.

As the result, the selector 49 reproduces the logical level of the disc identification code Ed modulated by the M series random number data MS as multi-value data, and generates multi-value reproduction data RX.

A pit center detecting circuit 50 comprises cascade-connected 16 stage flip-flops and OR circuits for serving to receive the predetermined output of these flip-flops as the modulation circuit 21 of the finishing unit 10. The pit center detecting circuit 50 transfers the frame pulse successively by means of these flip-flops to generates a middle detecting signal CT having the signal level which is kept high during the time period of 1 channel clock cycle at the middle of the pit of 11T cycles and the middle of the land of 11T cycle.

A sub-code detecting circuit 51 monitors the binary signal BD with reference to the channel clock CCK and decodes the sub-code information from the binary signal BD. Further, the sub-code detecting circuit 51 monitors the time information in the decoded sub-code information, and generates a one second detection pulse SECP having the signal level which jumps up every 1 second change of the time information.

An adder 52 is a 16-bit digital adder, adds the reproduction data RX and the output data AX of an accumulator (ACU) 53 and sends it out. The accumulator 53 comprises a 16-bit memory for holding the output data of the adder 52 and functions as an accumulating adder together with the adder 52 because the data held in the accumulator 53 is fed back to the adder 52. In detail, the accumulator 53 clears the counter held by the 1 second detection pulse SECP and thereafter records the output data of the adder 52 at the timing of the middle detection signal CT. As the result, the adder 52 accumulates the logical value of the reproduction data RX reproduced by the selector 49 during every second (7350 frames) of the time information with reference to the sub-code information and generates the accumulated value AX.

A binarization circuit 54 binarizes the output data AX of the accumulator 53 with reference to the predetermined reference value at the rising timing of 1 second detection pulse SECP and sends it out. The reproduction data RX of the disc identification code ED reproduced by the selector 49 is thereby converted to a binary disc identification code ED.

An ECC circuit 55 performs error correction processing of the disc identification code ED by use of an error correction code added to the disc identification code ED and sends it out.

(1–2) Operation of First Embodiment

In the above-mentioned structure, in the manufacturing process of the compact disc 1 in accordance with the present invention, a mother disc is made by means of a normal mastering machine, and a disc board 2 is made by the stamper made from the mother disc. Further, a reflection recording surface 3 and a protecting film 4 are formed on the disc board 2 to make a compact disc 1 (FIG. 2). The pit and land having a length of integral multiple of basic length corresponding to the predetermined basic cycle T are repeated on the compact disc 1, and the digital and audio signals are recorded.

The same film structure as that of the information recording surface of a CD-R is applied to the reflection recording surface 3 of the compact disc 1, and when a laser beam of the beam quantity equal to or larger than a prescribed value is irradiated onto the reflection recording surface 3, the reflectance of the reflection recording surface 3 is changed reversibly at the position where the laser beam is irradiated, as the result the sub-data is recorded in addition to the main data recorded in the form of repeated pit and land.

The predetermined area of the compact disc 1 which has been made through the above-mentioned process is reproduced in the finishing unit 10 (FIG. 1) under the control of the system control circuit 28, and a disc identification code ED is recorded on the predetermined area so that the disc identification code does not cause any adverse effect on reproduction of the digital audio signal recorded in the form of repeated pit and land.

In detail, in the finishing unit 10, the reproduction signal RF obtained from the optical pickup is converted to a binary signal BD by the binarization circuit 16, and a sync pattern is detected from the binary signal in the sync pattern detecting circuit 18. In the above-mentioned operation, the start timing of the pit and land having the longest cycle of 11T from among pits and lands formed on the compact disc 1 is detected.

The subsequent sync pattern predicting circuit 19 generates a frame pulse FP having the signal level which rises at the timing of starting of the sync pattern, and thereby detects the starting timing of the pit and land of 11T cycles at the correct timing even if the binary signal BD is reproduced not correctly due to defect or the like.

Further, in the modulation circuit 21 (FIG. 4), the flip-flops 22A to 22P transfer the frame pulse FP successively, outputs from the 5-th stage flip-flop and 16-th stage flip-flop are synthesized, and 1 channel clock cycle T of the middle of the pit and 1 channel clock cycle T of the middle of the land are thereby detected for the pit and land of 11T cycle.

In connection to the above-mentioned operation, the sub-code detecting circuit 20A (FIG. 1) reproduces a sub-code, detects the information for specifying the reproduction position from the sub-code based on minute (AMIN) and second (ASEC), and the subsequent read only memory 20B generates the disc identification code ED corresponding to the information for specifying the reproduction position. At that time, the read only memory 20B holds the disc identification code ED based on the pit information and sends out the disc identification code ED held by use of the information of minute (AMIN) and second (ASEC) as the address, and as the result, the disc identification code ED is sent out at a bit rate as extremely low as 1 bit per 1 second.

Further, the M series generating circuit 23 generates an M series random number data MS which includes logic 1 and logic 0 with an equal probability synchronously with the frame pulse FP, and the exclusive OR circuit 24 modulates the disc identification code ED by use of the M series random number data MS. Further, the AND circuit 26 gates the output of the exclusive OR circuit 24 with the output of the OR circuit 25, and thereby generates the control signal MX having the signal level which rises at the respective middle of the pit and land of 11T cycles corresponding to the disc identification code ED modulated by use of the M series random number data MS.

The beam quantity of the laser beam is raised in response to the control signal MX to cause local reflectance change of the reflection recording surface of the compact disc 1, a mark is thereby formed locally on the respective pits and lands of 11T cycle, and the disc identification code ED is formed.

The mark is formed at the middle of the pit and land of 11T cycle, as the result, the signal level of the reproduction signal corresponding to each edge of the pit and land, which signal level is varying depending on the pit and land, has the same signal level in the case of marking as the signal level in the case of no marking. As described herein above, the disc identification code ED namely sub-data is recorded without any adverse effect on reproduction of the main data in the form of pit and land.

A beam spot having a diameter D1 represented by the following equation is formed on the information recording surface of the compact disc 1:

$$D1=1.22 \cdot \lambda / NA \tag{4}$$

wherein NA is a numerical aperture of the optical system for reproducing pit string data of this type, $\lambda$ is a wavelength of the laser beam, and D1 represents a half band value of a beam spot.

Because the mark is formed at the position located the distance D1 apart from the neighboring edge as described herein above, the beam spot scans a mark and an edge not simultaneously. On the other hand, the position information of the edge corresponds to the timing when the signal level of the reproduction signal RF crosses the threshold value which has been set to the value of average level of the reproduction signal RF, and the timing corresponds to the timing when the center of the beam spot crosses the edge. In this timing system, the timing when the signal level crosses the threshold value in the case of no marking is the same as that in the case of marking as long as the laser beam irradiates the mark not simultaneously.

By replacing the diameter D1 in the equation (4) with 1/2 D1, the following equation is obtained. By forming the mark a the position located the distance D1 apart from the neighboring edge, the disc identification code ED namely sub-data is reproduced without any adverse effect on the reproduction of the main data in the form of pit and land.

$$D1=1.22 \cdot \lambda / 2 \cdot NA \tag{5}$$

The general value of the numerical aperture NA of a compact disc player is 0.45 and the wavelength $\lambda$ is 0.78 ($\mu$m), then the equation (5) gives D=1.06 ($\mu$m). Because the compact disc 1 is rotated at a linear speed of 1.2 (m/sec) and the frequency of the channel clock CK is 4.3218 (MHz), if a mark is formed at the position located a distance corresponding to 4 channel clock cycles apart from an edge, the mark is resultantly formed at the position located a distance equal to or longer than D1 calculated by the equation (5) apart from an edge.

If a mark is formed at the position located a distance corresponding to a value equal to or larger than about 4T cycles apart from the edge of the pit and land, the edge information of the pit and land and the information of the mark, both information are detected in the same manner based on the beam quantity change of the reflected beam, are reproduced separately. As the result, the disc identification code ED namely sub-data is recorded so that the disc identification code does not cause any adverse effect on the reproduction of the main data in the form of pit and land.

By modulating the disc identification code ED by use of the M series random number data MS in which logic 1 and logic 0 are included with the equal probability, the change of the reproduction signal RF due to the reflectance change is viewed as if the noise is included in the reproduction signal RF, as the result, the disc identification code ED is made difficult to be viewed and found. Further, the disc identification code ED is made difficult to be copied.

In addition to the above-mentioned advantages, because 1 bit of the disc identification code ED is allocated to 1 second time period, that is, because 1 bit is distributed to total 7350 (7350=75×98) CD frames for recording, the disc identification code ED is reproduced consistently even if the reproduction signal is changed due to noise.

The pit string digital audio signal D1 in the compact disc 1 on which the disc identification code ED is recorded as described herein above is undesirably copied by the conventional illegal copying procedure, however the disc identification code ED can not be copied.

In detail, to make an illegal copy of the compact disc 1 so that the content of the copy is exactly the same as that of the original, the disc identification code ED is required to be recorded in the form of the mark, therefore, a disc recording medium having a reflection recording surface on which the pit string digital audio signal D1 has been recorded previously is required. Further, an apparatus having the same structure as that of the finishing unit 10 is required. As described herein above, the disc identification code ED is difficult to be copied.

In other words, in the compact disc player 30, the reproduction signal RF having the signal level which varies depending on the beam quantity of the reflected beam obtained by irradiating the laser beam onto the compact disc 1 (FIG. 5) made through the process as described herein above is detected, the signal level of the reproduction signal RF changes thereby depending on the pit and land and depending on the reflectance of the compact disc 1, and the reproduction signal RF is resultantly binarized by the binarization circuit 35. The binary signal BD is subsequently binary identified by the EFM demodulation circuit 37, thereafter subjected to EFM demodulation and deinterleave, and error corrected by the ECC circuit 38 to thereby generates the digital audio signal D1.

At that time, on the compact disc 1, because the mark where the reflectance is changed locally is formed at the middle of the pit and land of 11T cycles that is the position located a distance corresponding to a value equal to or larger than 4T cycles apart from the neighboring edge (from front edge and rear edge), the signal level change around each edge due to forming of the mark is prevented, as the result, the compact disc 1 is reproduced correctly by use of an ordinal compact disc player even though the disc identification code ED is recorded on the compact disc 1.

In reproduction of the digital audio signal D1 executed as described herein above, the predetermined area of the compact disc 1 receives an access, the disc identification code ED is reproduced from the area, and if the disc identification code ED is reproduced not correctly, the digital/analog conversion processing by the digital/analog conversion circuit 39 is stopped because the content of the compact disc 1 is regarded as an illegal copy.

In detail, in reproduction of the disc identification code ED (FIG. 6), the sync pattern detecting circuit 43 detects the frame sync of the compact disc 1, and the M series generating circuit 45 generates the M series random number data MZ corresponding to the M series random number data MS in recording with reference to the detection of the frame sync.

The analog/digital conversion circuit 47 converts the analog reproduction signal RF to the digital reproduction signal, and the selector 49 selects the original digital reproduction signal or the digital reproduction signal having the inverted polarity with reference to the M series random number data MZ, as the result the reproduction data RX of multi-value data which expresses the logical level of the disc identification code ED is thereby reproduced.

In the compact disc 1, the reproduction data RX is accumulated by the accumulator 53 and adder 52 in 1 second unit, and SN ratio is thereby improved. The accumulation result is binarized by the binarization circuit and the disc identification code ED is decoded, and then error corrected by the ECC circuit 55 and provided to the system control circuit 40.

(1–3) Effect of First Embodiment

According to the above-mentioned structure, the pit and land of the sync pattern having 11T cycles is detected, the mark is formed at the middle of the pit and land which is located a distance corresponding to a value equal to or larger than 4T cycles apart from the edge and the disc identification code is recorded, the reflection film of the pit and land is locally changed at the timing so as not to adversely affect the position information of the edge, as the result the disc identification code is recorded so that the disc identification code does not cause any adverse effect on reproduction of the digital audio signal D1 in the form of pit string, and the disc identification code is reproduced by the optical pickup for reproducing the digital audio signal D1 and is difficult to be illegally copied.

The disc identification code is recorded by marking on the pit and land of the sync pattern recorded periodically, and the disc identification code can be recorded easily utilizing the periodic property.

At that time, 1 bit of disc identification code is allocated to the pit and land of the sync pattern allocated in about 1 second for recording, and the disc identification code is thereby reproduced consistently without any adverse effect of noise.

The disc identification code is modulated by use of the M series random number data for recording, the disc identification code is thereby recorded so that it is difficult to distinguish between the disc identification code and noise, and it is made difficult to find and analyze the disc identification code. The disc identification code is reproduced without any adverse effect of noise during reproduction.

The mark is formed so that the length of the mark is equal to the length corresponding to the basic cycle T, the disc identification code is thereby recorded so as to be difficult to be distinguished from noise, and it is made difficult to find and analyze the disc identification code.

In the compact disc player, the signal level of the reproduction signal RF is detected to decode the disc identification code, and the signal level is accumulated to remove the effect of noise mixed in the disc identification code, the disc identification code ED which is recorded so as not to be distinguished from noise is reproduced consistently.

The selector selectively processes the digital reproduction signal by use of the M series random number data MZ to reproduce the disc identification code, the disc identification code which is recorded so as to be difficult to be found and analyzed is reproduced consistently

(2) SECOND EMBODIMENT

Figure 7:
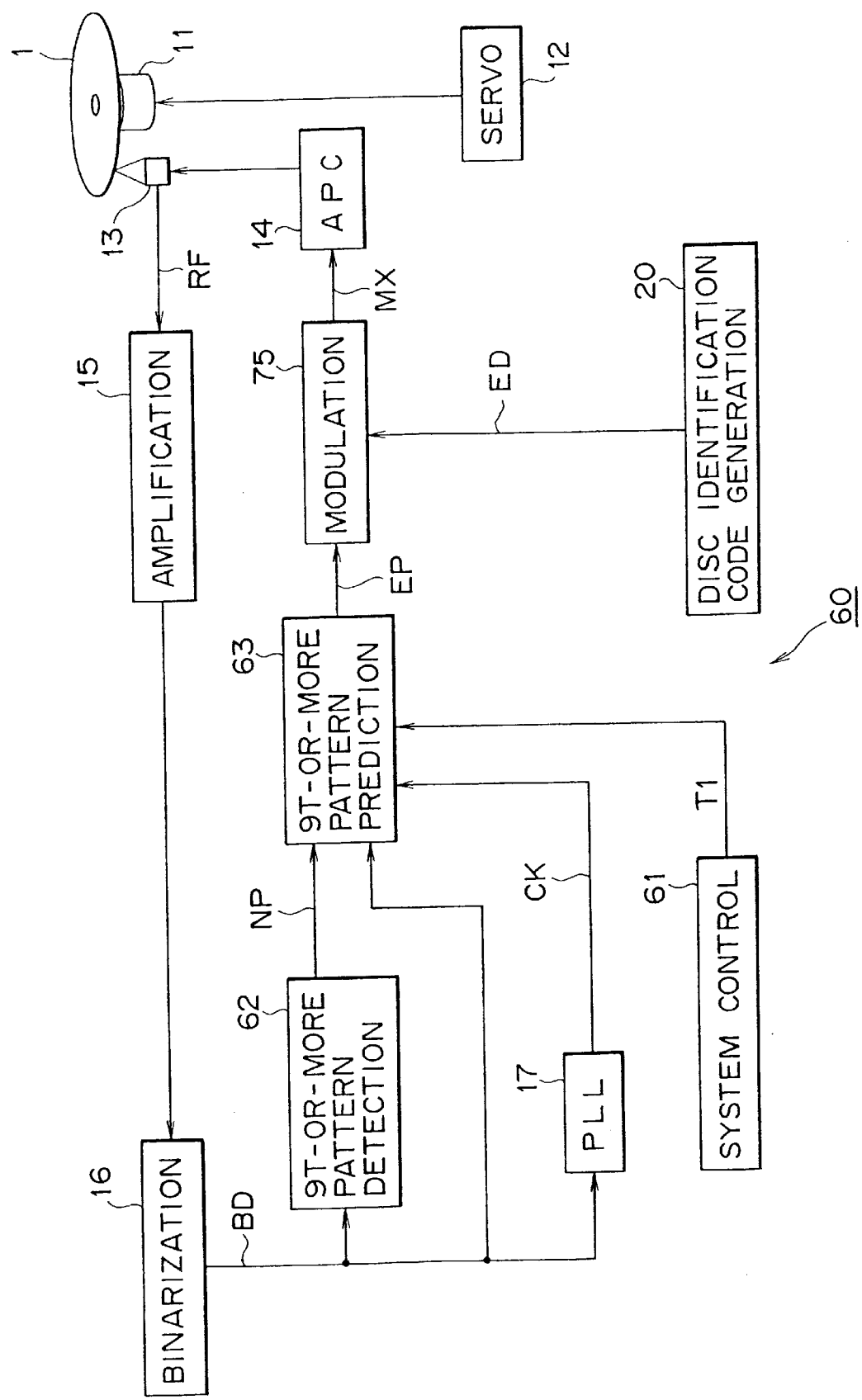
FIG. 7 is a block diagram for illustrating a compact disc finishing unit in accordance with the second embodiment of the present invention.

FIG. 7 is a block diagram for illustrating a finishing unit in accordance with the second embodiment of the present invention. The finishing unit 60 detects pits having a cycle equal to or longer than 9T, and records the disc identification code ED on these pits. In the structure shown in FIG. 7, the same components as those of the finishing unit 10 shown in FIG. 1 are given the same corresponding characters, and the repeated description is omitted.

In detail, in the finishing unit 60, the system control circuit 61 comprises a computer for controlling the whole operation of the finishing unit 60, controls the operation of an optical pickup 13 with reference to a sub-code detected from the reproduction signal RF, and traces successively twice the area set on the recording area of the disc identification code ED by means of the optical pickup 13.

At that time, the system control circuit 61 holds the trace signal T1 in logic 0 in the first trace, on the other hand, switches the trace signal T1 to logic 1 in the second trace in which the place traced in the first trace is traced again. The first trace is for detecting a pit having a cycle equals to or longer than 9T, on the other hand, the second trace is for additional recording of the disc identification code on the pit having a cycle equal to or longer than 9T based on the detection result.

A 9T-or-more pattern detecting circuit 62 detects the pulse width of 9T or more channel clocks in the first trace to detect pits of 9T or more cycles.

Figure 8:
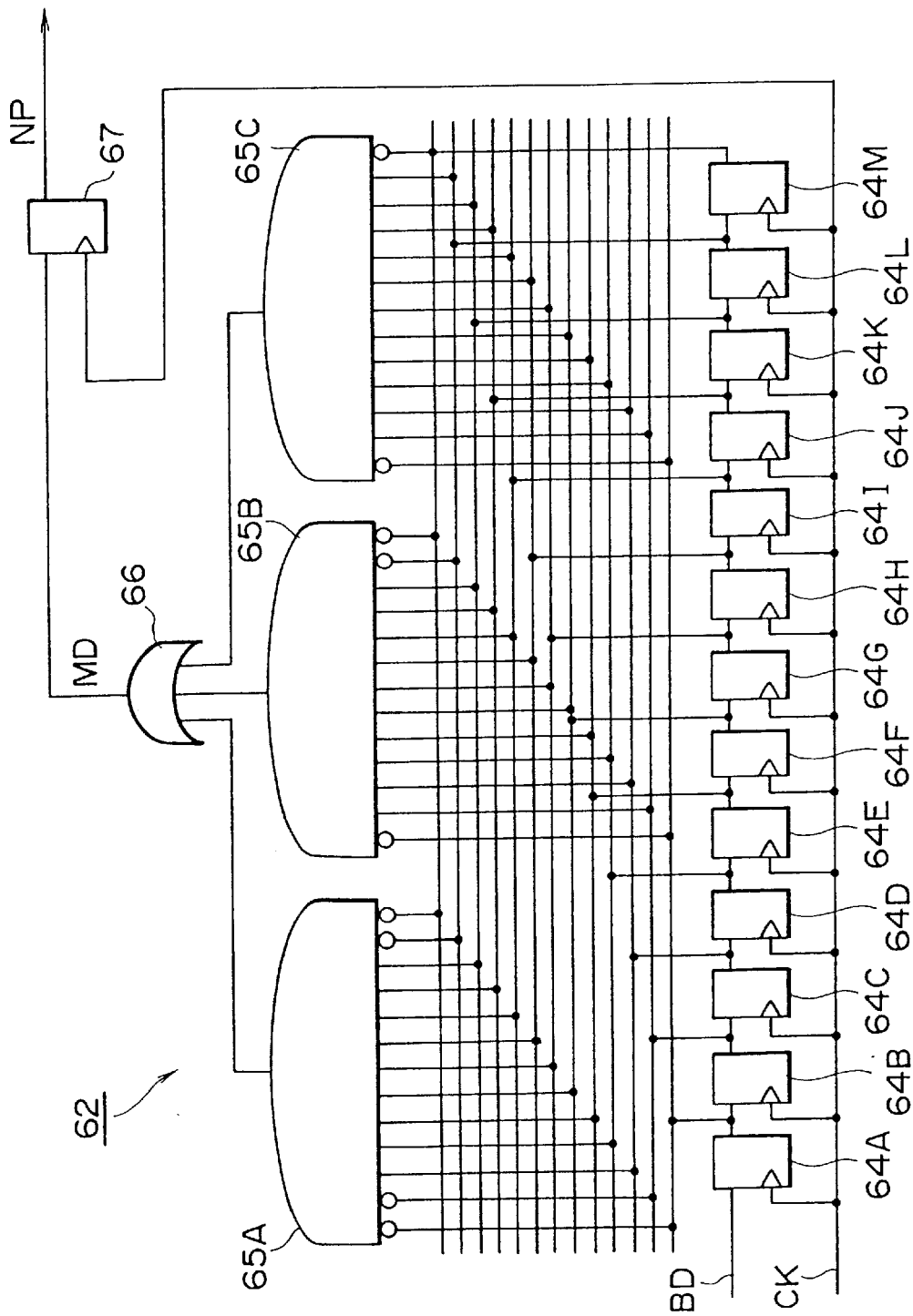
FIG. 8 is a block diagram for illustrating a 9T-or-more pattern detecting circuit of the finishing unit shown in FIG. 7.

In detail, as shown in FIG. 8, the 9T-or-more pattern detecting circuit 62 comprises cascade-connected 13 stage flip-flops 64A to 64M, and provides a binary signal BD to the first stage flip-flop out of the flip-flops 64A to 64M. These flip-flops 64A to 64M successively transfer the input data synchronously with the channel clock CK.

An AND circuits 65A to 65C receive outputs of respective flip-flops 64A to 64M and generate a logical product. At that time, the AND circuit 65A receives the output with inverted logic level sent out from the first stage flip-flop 64A, second stage flip-flop 64B, 12-th stage flip-flop 64L, and final stage 64M, and when the output of the logic "0011111111100" is thereby obtained, that is, when the logical level corresponding to the pit form having a length of 9T occurs consecutively, the logical level of a logical product is raised.

The subsequent AND circuit 65B receives the output with inverted logic level sent out from the first stage flip-flop 64A, 12-th stage flip-flop 64L, and final stage flip-flop 64M, and when the output of the logic "0011111111110" is thereby obtained, that is, when the logical level corresponding to the pit form having a length of 10T occurs consecutively, the logical level of a logical product is raised.

The AND circuit 65C receives the output with inverted logic level sent out from the first stage flip-flop 64A and the final stage flip-flop 64M, and when the logical level corresponding to the pit form of the logic "0111111111110" is thereby obtained, that is, when the logical level corresponding to the pit form having a length of 11T occurs consecutively, the logical level of a logical product is raised.

An OR circuit 66 calculates a logical OR of output signals supplied from the AND circuits 65A to 65C to thereby generate a logical OR signal MD so as to be logic "1" when the pit of any one of 9T, 10T, and 11T cycles is detected. The flop-flop 67 samples the logical OR signal by use of the channel clock CK for waveform shaping to thereby remove the effect of glitch noise, and generates a detecting pulse NP.

The 9T-or-more pattern predicting circuit 63 switches operation depending on the logical level of the trace signal T1 supplied from the system control circuit 61 to thereby record the position information of the pit having a length equal to or longer than 9T cycles in the first trace, on the other hand, generates the timing signal for recording the disc identification code based on the position information recorded as described herein above in the second trance.

Figure 9:
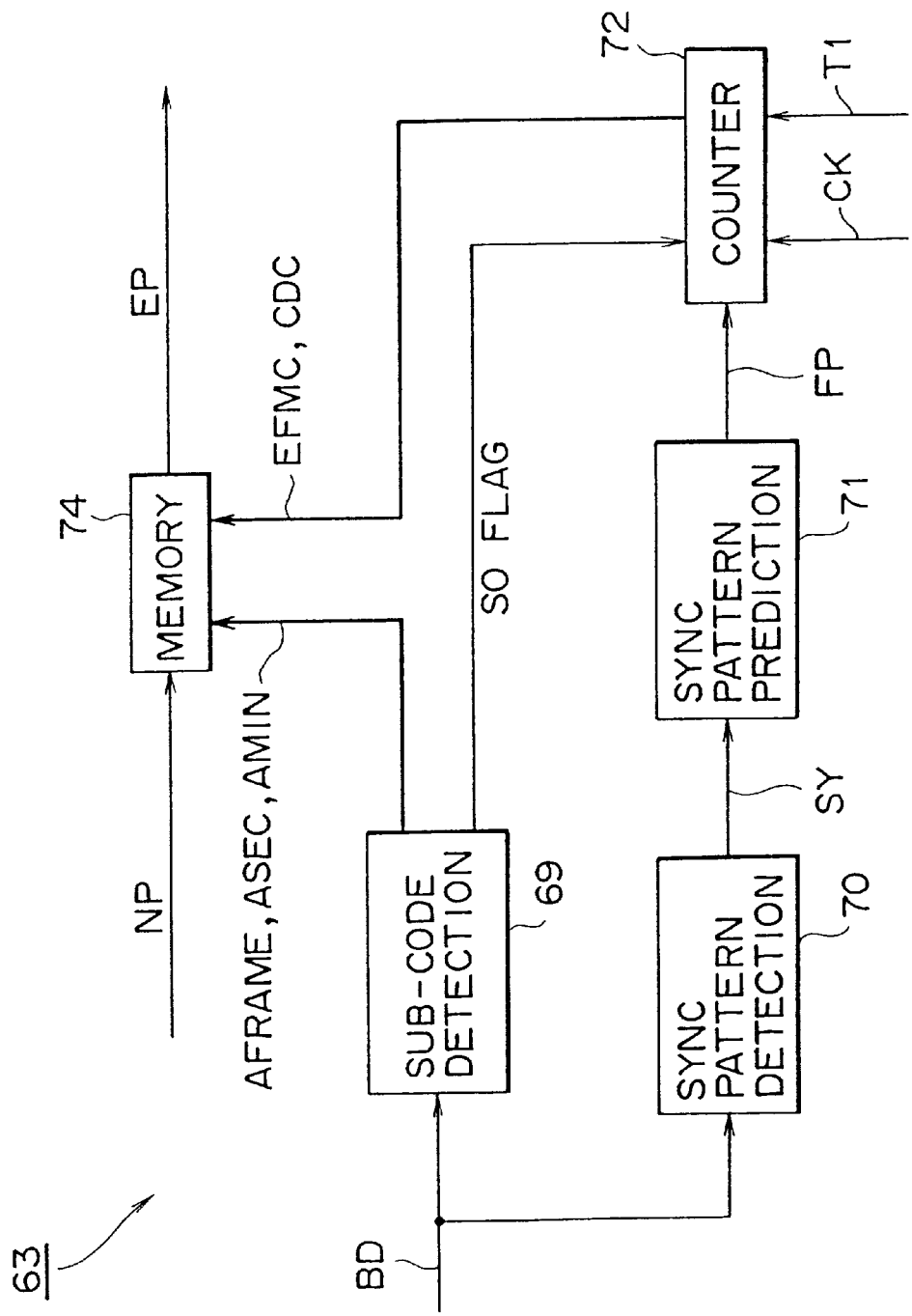
FIG. 9 is a block diagram for illustrating a 9T-or-more pattern predicting circuit of the finishing unit shown in FIG. 7

In detail, as shown in FIG. 9, in the 9T-or-more pattern predicting circuit 63, a sub-code detecting circuit 69 processes the binary signal BD with reference to the channel clock CK to thereby reproduce the position information (frame (AFRAME), second (ASEC), and minute (AMIN)) of the compact disc 1 recorded as the sub-code. Herein, the frame (AFRAME) is the position information formed by dividing 1 second into 75 time periods. Further, the sub-code detecting circuit 69 decodes SO flag (sync pattern for sub-coding) included in the sub-code to generate the decoded SO flag as a sub-code flag SOFLAG for indicating 1 frame of the sub-code.

A sync pattern detecting circuit 70 monitors the logical level of consecutive binary signals BD with reference to the channel clock CK to detect the sync frame, and generates a sync frame detection signal SY having the signal level which rises at the starting timing of each frame.

A sync pattern prediction circuit 71 comprises a ring counter for counting the channel clock with reference to the sync frame detection signal SY, and thereby sends out a frame pulse FP having no defect by utilizing the periodical property of the sync frame even if the sync frame is not detected by the sync pattern detecting circuit 70 due to defect or the like.

A counter 72 comprises a ring counter for counting up the channel clock CK with reference to the frame pulse FP, and thereby generates a count value EFMC consisting of the position information to divide 1 EFM frame into 588 divided frames. Further, the counter 72 counts up the frame pulse FP with reference to the sub-code flag SOFLAG to thereby generate a count value CDC consisting of position information to divide 1 CD frame into 98 divided CD frames.

As described herein above, in generation of the count value EFMC and CDC, the counter 72 counts up the consecutive channel clock CK so that the count value EFMC is changed to 0 at the rising timing of the frame pulse FP if the trance signal T1 is logic 0 (in other words, in the first trace), on the other band, counts up the consecutive channel clock CK so that the count value EFMC is changed to a value 7 at the rising timing of the frame pulse FP if the trace signal T1 is logic 1 (in other words, in the second trace).

7 cycles of the channel clock CK corresponding to the value 7 corresponds to the delay time while the timing signal EP is provided in response to the count value EFMC and the beam quantity rises with respect to the laser beam irradiation position specified by the count value EFMC The counter 72 counts up the channel clock CK so that the count value EFMC is advanced to recover the delay time in the second trace.

A memory 74 comprises a memory for recording the detection pulse NP by use of the position information (frame (AFRAME), second (ASEC), and minute (AMIN) ) reproduced by the sub-code detecting circuit 69, and the count value EFMC and CDC consisting of the position information provided by the counter 72 as the address, and switches the operation depending on the trace signal T1. In detail, if the trace signal T1 is logic 0 (in other words, in the first trace), then the memory 74 records the detection pulse NP supplied from the 9T-or-more pattern detecting circuit 62 by use of these position information as the address. On the other hand, if the trace signal T1 is logic 1 (in other words, in the second trace), the memory 74 sends out the content, which is held by use of these position information as the address, as the timing signal EP.

A modulation circuit 75 has the structure similar to that of the afore mentioned modulation circuit 21 shown in FIG. 4. In detail, the modulation circuit 75 comprises cascade-connected flip flops of a predetermined stages, these flip-flops successively transfer the frame pulse FP with the channel clock cycle. Further, the modulation circuit 75 receives the output from a flip-flop of the predetermined step to thereby generate a timing signal having the logical level which is kept high during 1 channel clock cycle T when the time elapses 4T cycles from the starting edge of a pit having a length equal to or longer than 9T cycles.

Further, the modulation circuit 75 generates an M series random number data with reference to the timing signal EP, and modulates the disc identification code ED by use of the random number data. Further, the modulation circuit 75 gates the modulation result by use of the timing signal generated by the flip-flops and sends it out as a control signal MX.

The finishing unit 60 records the disc identification code on the pit having a length equal to or longer than 9T cycles which satisfies the condition specified by the equation (5) as described herein above.

In detail, the reflectance can be changed without any adverse effect on the neighboring edge position information as long as the reflectance is changed during 1T cycle at the location 4T cycles apart from the starting side edge of the pit having a length equal to or longer than 9T cycles. In general, the pit having a length equal to or longer than 9T cycles occurs more often than the pit and land having a length of 11T cycles. Therefore, 1-bit disc identification code is recorded on many pits, the reliability of the disc identification code is improved the more.

As described herein above, in reproduction of the compact disc in accordance with the present embodiment, the pattern detecting circuit having the same structure as that of the 9T-or-more pattern detecting circuit 62 applied to this finishing unit 60 detects the pit having a length equal to or longer than 9T, detects the signal level of the reproduction signal RF of the pit, and reproduces the disc identification code.

According to the second embodiment, the pit having a length equal to or longer than 9T cycles is detected, the reflectance of the information recording surface is changed locally at the timing located a predetermined distance apart from the edge of the pit, and the disc identification code is recorded, as the result, the same effect as obtained by the first embodiment is obtained. The disc identification code is recorded on the pit which occurs more often than in the first embodiment, the disc identification code is recorded more consistently, and the recording density of the disc identification code is improved by shortening the time allocated to 1 bit disc code identification as required.

(3) THIRD EMBODIMENT

Figure 10:
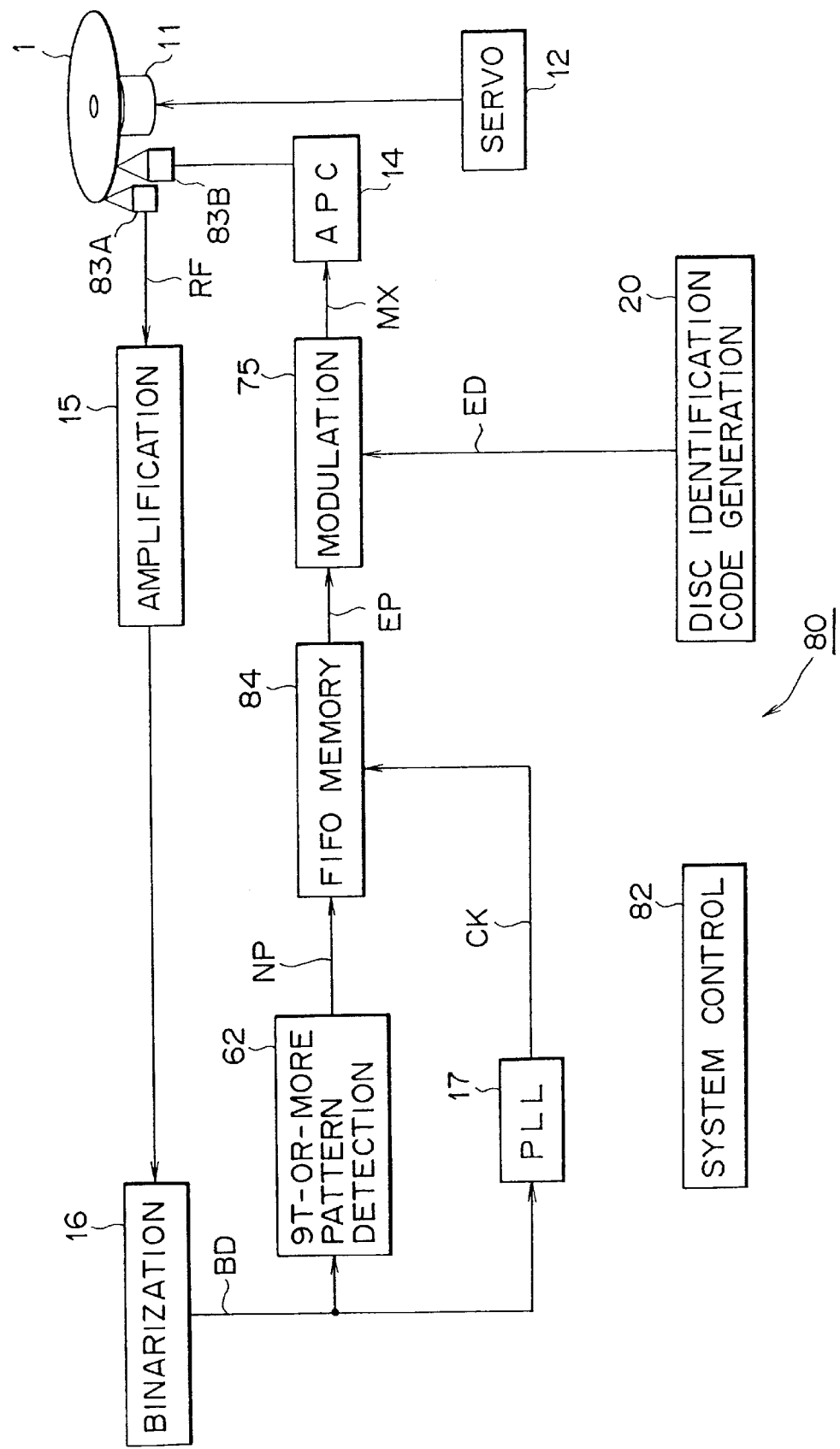
FIG. 10 is a block diagram for illustrating a compact disc finishing unit in accordance with the third embodiment of the present invention.

FIG. 10 is a block diagram for illustrating a compact disc 1 finishing unit in accordance with the third embodiment. This finishing unit 80 performs pit detection processing of the pit having a length equal to or longer than 9T cycles and additional recording processing of the disc identification code simultaneously in parallel. The same components shown in the structure shown in FIG. 10 as those of the above-mentioned finishing unit 60 shown in FIG. 7 are given the same corresponding characters, and repeated description is omitted.

In detail, in the present embodiment, the finishing unit 80 is provided with a preceding read out optical pickup 83A and a recording optical pickup 83B for scanning the scanned trace where the preceding read out optical pickup 83A has scanned with a delay of a predetermined time period.

The finishing unit 80 processes the reproduction signal RF suplied from the preceding read out optical pickup 83A to detect the pit having a length equal to or longer than 9T cycles, and records the disc identification code ED supplied from the following recording optical pickup 83B with reference to the detection result.

In detail, the finishing unit 80 provides the detection result NP of the 9T-or-more pattern detecting circuit 62 to a FIFO memory 84 and provides it to a modulation circuit 75 with delay of a predetermined time period to thereby compensate the delay time corresponding to the time period while the recording pickup 83B scans the scanned trace where the preceding read out optical pickup 83A has scanned.

A system control circuit 82 comprises a computer for controlling the operation of the finishing unit 80, and controls the optical pickups 83A and 83B to seek at the recording position of the disc identification code.

According to the structure shown in FIG. 10, the effect that the required processing time is shortened is obtained in addition to the same effect as obtained in the second embodiment by performing the pit detection processing for detecting the pit having a length equal to or longer than 9T cycles and the additional recording processing for recording the disc identification code simultaneously in parallel.

(4) OTHER EMBODIMENTS

The case in which the film structure of CD-ROM is applied to the reflection recording surface is described in the above-mentioned embodiments, however the present invention is by no means limited to the case, for example, the film structure of phase change type optical disc may be applied. Otherwise, a reflection film consisting of ordinal aluminum alloy may be used because a slight change is sufficient for the purpose.

The case in which the reflectance of the information recording surface is changed locally at the position located a distance equal to or longer than 5T cycles apart from the edge of the pit is described in the above-mentioned first embodiment and the case in which the reflectance of the information recording surface is changed locally at the position located a distance equal to or longer than 4T cycles apart from the edge of the pit is described in the second and third embodiments, however the present invention is by no means limited to these cases, the same effect may be obtained by applying a method in which the reflectance of the information recording surface is changed at the position located a distance equal to or longer than 3T cycles apart from the edge of the pit.

Further, the information can be recorded by use of all pits and spaces regardless of the pit size if the reflectance change is small.

In detail, when the reflectance of the information recording surface of the edge portion of the pit is changed slightly, jitter occurs on the reproduction signal. However, a compact disc player can reproduce pit string data substantially without any problem even though slight jitter occurs in the reproduction signal generated from the pit. Therefore, if larger jitter is allowed as described herein above, the disc identification code may be recorded by changing the reflectance of all pits and spaces slightly (about 2%) regardless the pit size and space length.

In connection with jitter, for example, the minimum inversion interval is specified to be 3 channel clocks in EFM system which is used for modulation of a compact disc. The minimum inversion interval is defined as the distance which is sufficient to ignore the occurrence of a jitter due to the change in reflectance of the pit at the position located a distance of the minimum inversion interval apart from the edge of the pit. Therefore, if the disc identification code ED is additionally recorded at the position located a distance equal to or longer than the minimum inversion interval apart from the edge of the pit, deterioration of jitter due to the disc identification code is suppressed to a sufficiently low value, and the pit string data can be reproduced consistently. As the result, the disc identification code can be recorded on a compact disc by changing the reflectance locally at the position located a distance corresponding to 3 channel clocks apart from the edge of the pit.

In the case that the disc identification code is recorded at the position located a distance corresponding to 3 channel clocks apart from the edge of the pit as described herein above, the disc identification code may be recorded on pits and lands having the length equal to or longer than 7T cycles.

In the above-mentioned second and third embodiments, the case in which the disc identification code is recorded on the pit having a length equal to or longer than 9T cycles is described, however the present invention is by no means limited to the case, the disc identification code may be recorded on the pit and land of equal to or longer than 9T cycles.

The case in which the disc identification code is recorded at the position located a distance corresponding to 4T cycles apart from the starting side edge of the pit having a length equal to or longer than 9T cycles is described in the above-mentioned second and third embodiments, however the present invention is by no means limited to the case, the disc identification code may be recorded at the middle of each pit having a length equal to or longer than 9T cycles.

Further, it is possible to record the disc identification code only on the land portion instead of the pit portion. Generally because the reflectance of the land portion is higher than that of the pit portion, recording/reproduction could be easier on the band position than on the pit portion.

The case in which the disc identification code is recorded on the predictable sync frame portion is described in the above-mentioned first embodiment, however the present invention is by no means limited to the case, the present invention may be applied to any signal as long as the signal which will appear is predictable previously. For example, if the signal recorded on a compact disc has been all or partially known previously, then the pit string on the disc is predictable. In such case, it is possible to apply the present invention, that is, the position located sufficiently far apart from the edge of the pit is predicted, and the laser output is increased during a moment at the predicted position to additionally record the disc identification code ED.

The case in which the reflectance of the information recording surface is changed locally with the size of 1 channel clock cycle on the pit having a length equal to or longer than a predetermined length is described in the above-mentioned embodiments, however the present invention is by no means limited to the case, because the disc identification code can be recorded without damage of the edge information as long as the reflectance is changed partially at the position located a prescribed distance apart from the front edge and the rear edge, for example, the reflectance may be changed over the middle 3T cycle portion of the 9T cycles pit and land.

The case in which the disc identification code is recorded is described in the above-mentioned embodiments, however the present invention is by no means limited to the case, otherwise in the case in which the ciphered pit digital audio signal is recorded and the key information required to decipher the signal is recorded or the data required to select and decode the key information is recorded, various data required to decipher may be recorded.

The case in which the disc identification code is recorded in the compact disc finishing unit is described in the above-mentioned embodiments, however the present invention is by no means limited to the case, otherwise the present invention may be applied to a compact disc player, for example, the number of reproduction of the data or number of copying of the data may be recorded in, for example, pit string.

The case in which the accumulated value accumulated by the accumulator is subjected to binary value identification to reproduce the disc identification code consisting of sub-data string is described in the above-mentioned embodiments, however the present invention is by no means limited to the case, otherwise the accumulated value may be subjected to multi value identification to reproduce the sub-data string.

The case in which the EFM modulated digital audio signal is recorded is described in the above-mentioned embodiments, however the present invention is by no means limited to the case, otherwise the present invention may be applied widely to various modulation such as 1–7 modulation, 8–16 modulation, and 2–7 modulation.

The case in which the desired data is recorded in the form of pit is described in the above-mentioned embodiments, however the present invention is by no means limited to the case, otherwise the present invention may be applied widely in the case of recording of the desired data in the form of mark and space.

The case in which the present invention is applied to the compact disc and peripheral apparatus to record the audio signal is described in the above-mentioned embodiments, however the present invention is by no means limited to the case, otherwise the present invention may be applied widely to various optical discs such as video disc and peripheral apparatus.

According to the present invention as described herein above, by changing the reflectance of the reflection film on which the pit is recorded, the sub-data string is recorded so that the sub-data string does not cause any adverse effect on reproduction of the main data string consisting of pit string, the sub-data string can be reproduced by an optical pickup for reproducing the main data string, and the sub-data string can not be copied illegally.

What is claimed is:

1. An optical disc recording apparatus comprising:
   irradiating means for irradiating with a light beam a main data string comprised of repeated pits and lands recorded on an information recording surface of a disc recording medium;
   detection means for detecting the repeated pits and lands of said main data string based on a reflection of said light beam from said information recording surface;
   memory means for temporarily storing a detection result from said detection means;
   random number generating means for generating a pseudo-random number series based on the repeated pits and lands detected by said detection means;
   control means for controlling said light beam to scan the repeated pits and lands based on the temporarily stored detection result from said detection means; and
   recording means for recording a sub-data string on said disc recording medium by changing the reflectance of said information recording surface; said recording means recording 1 bit of said sub-data string over a plurality of the repeated pits and lands; said recording means having light quantity switching means for temporarily increasing an intensity of said light beam to locally change the reflectance of said information recording surface based on the detection result, said pseudo-random number series, and said sub-data string.

2. An optical disc recording apparatus comprising:

a first optical system for irradiating with a first light beam a main data string comprised of repeated pits and lands recorded on an information recording surface of a disc recording medium;

detection means for detecting the repeated pits and lands of said main data string based on a reflection of said first light beam from said information recording surface; and recording means for recording a sub-data string on said disc recording medium by changing the reflectance of said information recording surface; said recording means recording 1 bit of said sub-data string over a plurality of the repeated pits and lands; said recording means having a second optical system for irradiating the disc recording medium with a second light beam behind the first light beam to locally change the reflectance of said information recording surface based on the detection result and said sub-data string.

3. An optical disc recording method comprising the steps of:

an irradiating step of irradiating with a light beam a main data string comprised of repeated pits and lands recorded on an information recording surface of a disc recording medium;

a detection step of detecting the repeated pits and lands of said main data string based on a reflection of said light beam from said information recording surface;

a storing step of temporarily storing a detection result from said detection step in a memory;

a random number generating step of generating a pseudo-random number series based on the repeated pits and lands detected by said detection step;

a control step of controlling said light beam to scan the repeated pits and lands based on the temporarily stored detection result from said detection step; and a recording step of recording a sub-data string on said disc recording medium by changing the reflectance of said information recording surface; said recording step recording 1 bit of said sub-data string over a plurality of the repeated pits and lands; said recording step temporarily increasing an intensity of said light beam to locally change the reflectance of said information recording surface based on the detection result, said pseudo-random number series, and said sub-data string.

4. An optical disc recording method comprising the steps of:

a first irradiating step of irradiating with a first light beam a main data string comprised of repeated pits and lands recorded on an information recording surface of a disc recording medium;

a detection step of detecting the repeated pits and lands of said main data string based on a reflection of said light beam from said information recording surface; and a recording step of recording a sub-data string on said disc recording medium by changing the reflectance of said information recording surface; said recording step recording 1 bit of said sub-data string over a plurality of the repeated pits and lands; said recording step irradiating the disc recording medium with a second light beam behind the first light beam to locally change the reflectance of said information recording surface based on the detection result and said sub-data string.

* * * * *